United States Patent [19]

Hartzell

[11] Patent Number: 5,678,315

[45] Date of Patent: Oct. 21, 1997

[54] SAW HANDLE HAVING A GRIP MEMBER PERPENDICULAR TO AND SYMMETRICAL ABOUT A SAW BLADE

[76] Inventor: Mark D. Hartzell, 6525 W. County Line Rd., Brown Deer, Wis. 53223

[21] Appl. No.: 674,431

[22] Filed: Jul. 2, 1996

Related U.S. Application Data

[63] Continuation-in-part of Ser. No. 523,563, Sep. 5, 1995, Pat. No. 5,555,627, which is a continuation of Ser. No. 290,350, Aug. 15, 1994, abandoned.

[51] Int. Cl.$^6$ .................................................. B23D 51/01
[52] U.S. Cl. .................................. 30/509; 30/507; 30/517
[58] Field of Search ............................... 30/507, 508, 509, 30/514, 517, 518, 519, 520, 166.3; D8/95, 96, 97

[56] References Cited

U.S. PATENT DOCUMENTS

| | | | |
|---|---|---|---|
| 65,947 | 6/1867 | Richardson . | |
| D. 321,119 | 10/1991 | Ciccone et al. ............... | D8/97 |
| 806,033 | 11/1905 | Wettich et al. . | |
| 1,100,305 | 6/1914 | Howell . | |
| 1,470,040 | 10/1923 | Whitehead . | |
| 1,485,261 | 2/1924 | Fearing ........................ | 30/166.3 |
| 1,518,488 | 12/1924 | Dandrea . | |
| 1,905,940 | 4/1933 | Lambert ....................... | 30/517 |
| 2,012,201 | 8/1935 | Okros ........................... | 145/34 |
| 2,014,722 | 9/1935 | Damon .......................... | 145/108 |
| 2,204,390 | 6/1940 | Albright ........................ | 30/513 |
| 2,303,705 | 12/1942 | Persson ......................... | 145/108 |
| 2,710,032 | 6/1955 | Clark ............................ | 145/35 |
| 3,329,186 | 7/1967 | David ............................ | 145/33 |
| 3,815,648 | 6/1974 | Dreier ........................... | 145/33 A |
| 3,840,059 | 10/1974 | Ingro ............................. | 30/514 |
| 5,555,627 | 9/1996 | Hartzell ......................... | 30/509 |

FOREIGN PATENT DOCUMENTS

| | | | |
|---|---|---|---|
| 100130 | 10/1940 | Sweden ............................. | 30/517 |
| 166281 | 3/1934 | Switzerland ...................... | 30/507 |
| 373099 | 3/1973 | U.S.S.R. ........................... | 30/507 |
| 1544555 | 2/1990 | U.S.S.R. ........................... | 30/507 |
| 530413 | 12/1940 | United Kingdom ............... | 30/507 |

*Primary Examiner*—Hwei-Siu Payer
*Attorney, Agent, or Firm*—Whyte Hirschboeck Dudek S.C.

[57] ABSTRACT

An open-ended handle is disclosed for use with framed saws, such as coping saws. The open-ended handle is generally J-shaped and has a grip member that is perpendicular to the saw blade. The open-ended handle is mounted to the saw such that the grip member is also symmetrical about the mounting point. The present invention provides an arrangement in which the hand-grip portion of the handle is symmetrical about a longitudinal axis of motion when the saw is in use to allow the greatest amount of power to be transferred to the saw blade along a single line of force which not only provides for accurate cutting, but also eases tension on the user's hand and wrist to reduce fatigue. This arrangement provides a saw that is equally balanced and usable in both an upright position and an inverted position for accurate and easy cutting in a downward direction as well as an upward direction. While holding a piece of work in one hand and the saw in another, a user can easily cut the work downward, flip the saw in a single motion to an inverted position, and finish the cut in an upward direction.

12 Claims, 3 Drawing Sheets

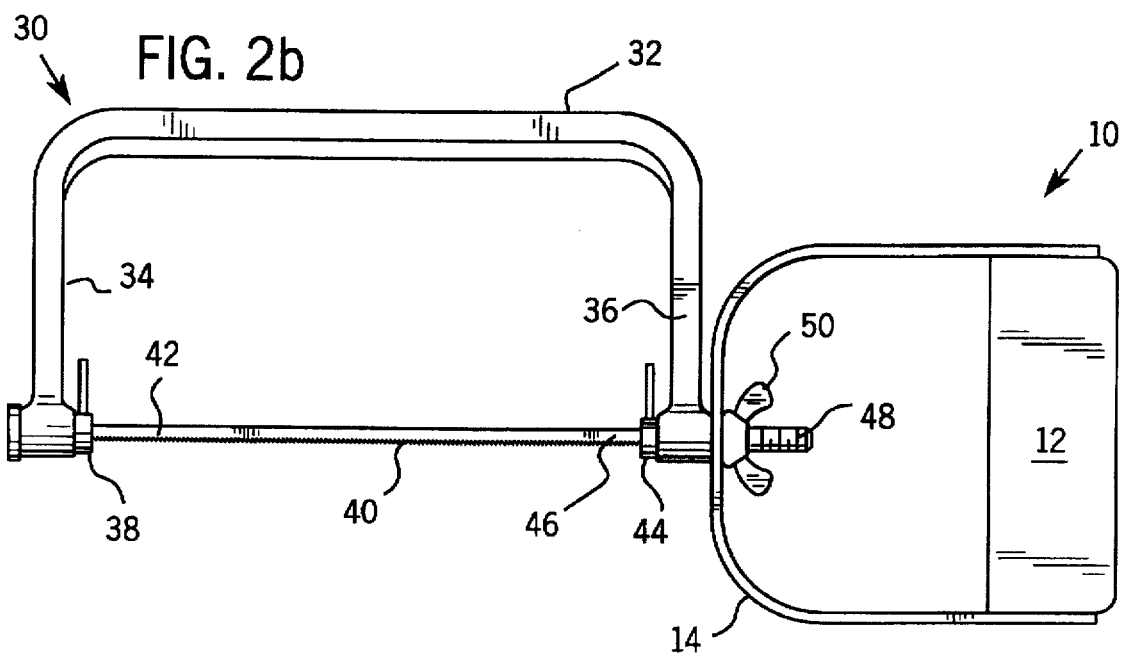
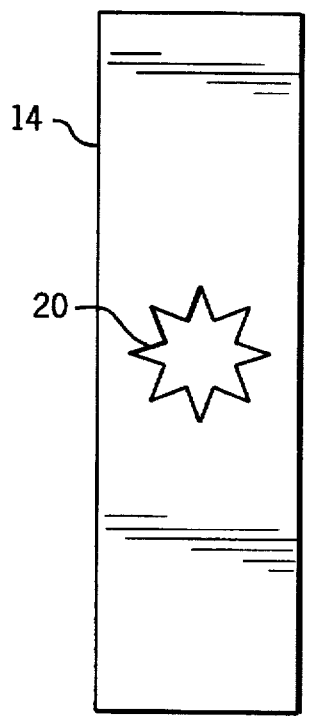
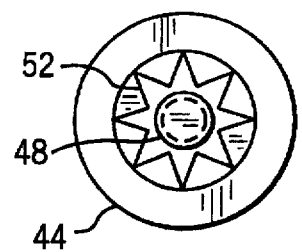

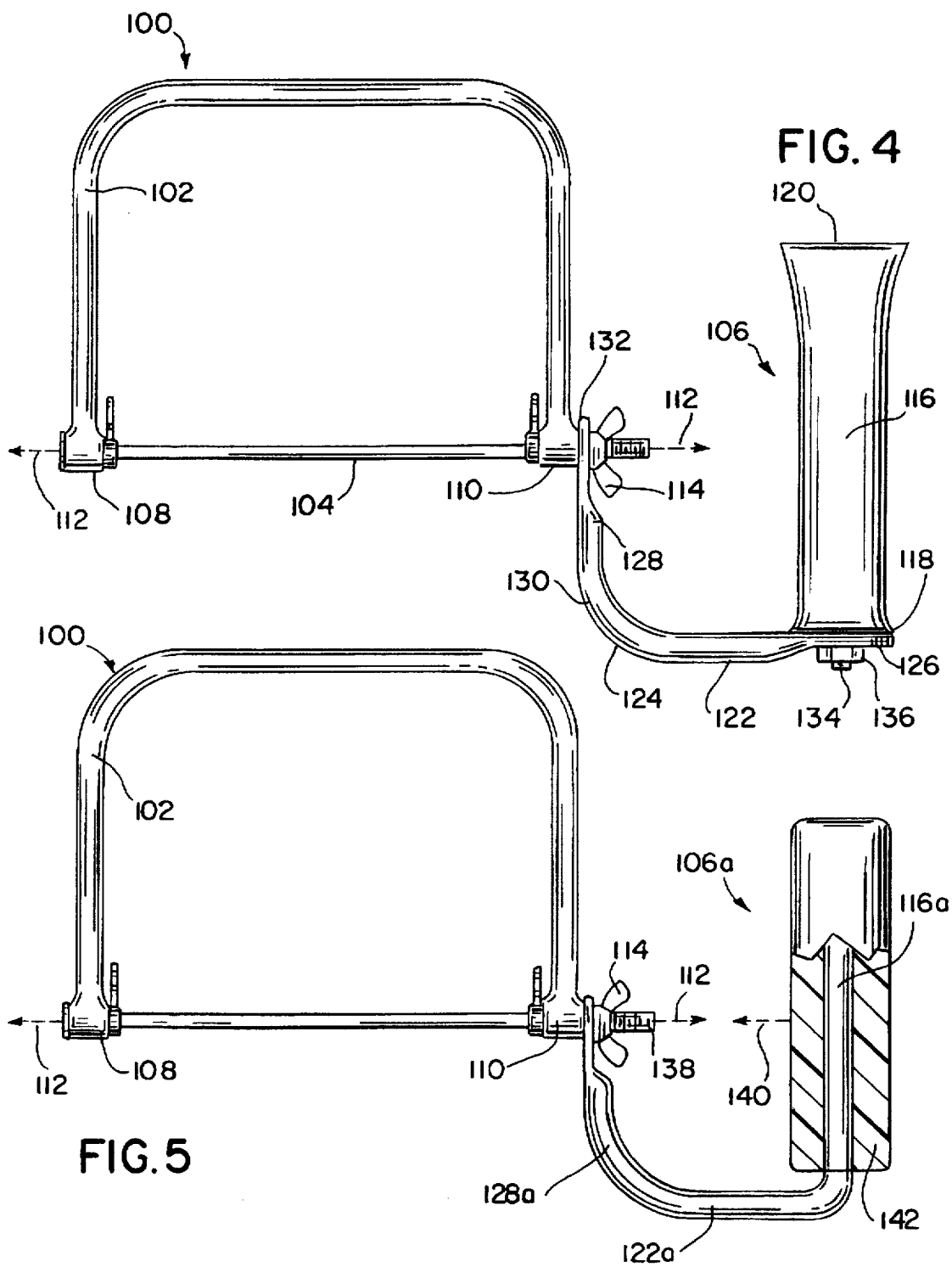

SAW HANDLE HAVING A GRIP MEMBER PERPENDICULAR TO AND SYMMETRICAL ABOUT A SAW BLADE

BACKGROUND OF THE INVENTION

This application is a continuation-in-part of U.S. application Ser. No. 08/523,563, filed Sep. 5, 1995 now U.S. Pat. No. 5,555,627 which is a continuation of abandoned U.S. application Ser. No. 08/290,350, filed Aug. 15, 1994, abn.

The invention relates generally to hand saws and more particularly, to an open-sided handle for coping saws.

Saws with thin blades for coping have been prevalent in the prior art for some time. The earliest form as in the frame saw, utilized the characteristic bulbous straight handle as an auxiliary handle and as a means of rotating the saw blade relative to the saw frame. Initially, the frame was grasped to transfer force to the cutting edge of the blade and to move the cutting edge across a work surface. In these early designs, two bulbous straight handles were located on opposite shanks of an open, rectangular shaped frame so that a blade held between the two shanks could be axially rotated by rotating the handles. To effect a cut, rotation of the blade was often necessary so that the saw frame did not interfere with the stroke. Today, the form of coping saw which is most prevalent utilizes a bulbous straight handle for two functions: 1) as a means for tightening a blade on a D-shaped frame, and 2) as a means for transferring downward force to the blade during the cutting stroke. Specifically, the first end of the blade is rotatingly attached to the blade holder on the first open end (shank) of the D-shaped frame. The second end of the blade is held by a blade holder which has a threaded shaft extending through an opening on the opposite, second open end (shank) of the frame. The bulbous handle is axially threaded to allow it to engage the threaded shaft so that as the handle is tightened on the shaft, the blade is tensioned between the first and second shanks of the frame. In this configuration, the axis of the handle is aligned with the axis of the blade, and the blade can be rotated relative to the frame to allow the frame to be positioned so as not to interfere with a cut.

Straight handles such as the one described above are undesirable because of the rapid fatigue of the hand created by the unnatural and extended position of the hand as it grasps the handle. Specifically, when grasping a straight handle, at least the thumb, index finger and the middle finger must apply a pinching grip to the handle, while at the same time the muscles in the outer portion of the hand are extended. This exertion often results in fatigue and soreness of the muscles in the hand and wrist. In day to day use, this strain on the hand and wrist can lead to Carpal tunnel syndrome, a condition that can permanently damage the nerves of the hand and wrist.

Additionally, this type of grip may inhibit the user from taking advantage of the faster cutting, coarser-toothed blades because the operator is unable to adequately transfer force to the cutting edge of the blade while maintaining control of the saw. Typically, a slow cutting, 20 tooth per inch (TPI) blade is used for the most demanding cuts in terms of effort and skill. Sometimes, a 15 TPI blade may be used, but rarely is the fastest cutting, 10 TPI blade used because it is difficult to maintain a grip on the straight handle and attain the power needed to direct the cut with such coarse blades. It is not unusual for coarser-toothed blades to become jammed in the saw kerf such that the user loses grip of the handle.

One type of handle which is old and well known in the art for use with other types of saws is the pistol grip handle. This type of handle has been utilized to increase the downward force which can be applied to the cutting edge of a saw blade so that cutting times can be decreased. Pistol grip handles also reduce a portion of the hand fatigue associated with the use of straight handles. The prior art is replete with examples of pistol grip handles, especially in combination with hacksaws. U.S. Pat. No. 1,470,040, issued to Whitehead, teaches a pistol grip handle which can be affixed to a bulbous straight handle to convert the straight handle to a pistol grip. The ends of the pistol grip are clamped around the straight handle and secured with fasteners so that the pistol grip handle angles down and away from the straight handle in the same plane as the saw blade. One drawback to this handle is that such a handle is difficult to manipulate because it attaches in line with the axis of the blade and extends down from this axis, creating a moment about the point of attachment.

U.S. Pat. No. 2,014,722, issued to Damon, describes a pistol grip handle which can be permanently attached to a standard D-shaped or L-shaped hacksaw frame. The handle is rigidly fixed at two points on the upper corner of the frame such that the portion of the handle which is gripped extends downward, adjacent the frame and in the same plane as the frame and the saw blade.

Another pistol grip handle is disclosed in U.S. Pat. No. 2,303,705. Again, the handle is rigidly fixed to a saw frame at two points on the frame so that the handle is angled down and away from the saw blade in the same plane as the blade. At least one shank of the handle is intended to be fixed to the saw frame under a certain degree of strain so that the handle has a certain inherent springiness.

Although the above mentioned pistol grip handles generally provide the optimum transfer of force to cutting blades, the angle of these handles relative to the saw blades limits the operators' ability to manipulate the saws to effect various cuts. Specifically, pistol grip handles are oriented on a downward angle, sloping away from the saw blade. This configuration facilitates cuts made in only one direction, i.e., toward the operator. When a pistol grip handle is properly grasped, the cutting edge of the saw must be substantially parallel with the operator's forearm, making it difficult and very uncomfortable to grip the saw handle and make a cut away from the operator.

However, because of the delicate and intricate nature of the work performed with coping saws, the required cuts are often multi-directional, such that the direction of the blade relative to the operator must often be altered to complete the cut. Although it is most desirable to make a single, uninterrupted cut, pistol grip handle saws render such a task difficult because of the manner in which the handle is grasped by the operator. Therefore, an operator may be required to interrupt a cut and reposition the saw blade to complete the cut. For example, if an operator is cutting a 180 degree symmetric curve, a first cut may be made toward the operator through the first 90 degrees of the arc. At this point along the cut, the cutting is interrupted and the saw is repositioned so that a second cut through the remaining 90 degrees can also be made toward the operator. Interrupting cutting, backing the saw blade out of the cut and repositioning the saw in the manner is often tedious and time consuming. Thus, these types of handles make it difficult to complete a single cut without interrupting the cut to reposition the saw and handle relative to the operator. Pistol grip handles, therefore, would be of little use in combination with coping saws or similar saws which are used to make multi-directional cuts.

Therefore, it is desirable to provide a handle for coping and similar saws which maximizes the force applied to the cutting edge of a saw blade, while minimizing hand fatigue. The handle should be easily manipulated for multidirectional cuts without the need for interrupting the cut to reposition the saw. It is further desirable to provide a handle which can be attached to a standard coping saw such that the handle can be rotated with the saw blade relative to the frame. Additionally, such a handle should be inexpensive and easily attached.

SUMMARY OF THE INVENTION

The present invention overcomes the aforementioned problems, and provides an open-sided saw handle for use on a saw frame having two ends and a blade attached therebetween. The saw handle of the present invention is comprised of a J-shaped member having a long end and a short end. The short end of the J-shaped member is attached to one end of the saw frame, and the long end of the J-shaped member is substantially perpendicular to the saw blade and substantially symmetrical about the point of attachment. The arrangement provides a saw handle having a line of force aligned with the saw blade, wherein the saw is equally balanced and usable in both an upright position and an inverted position.

In accordance with another aspect of the invention, a saw is disclosed having a saw blade with a longitudinal axis of motion when the saw is in use, and a frame having two ends with the saw blade attached therebetween. The saw has an open-ended handle attached to one end of the frame such that a hand-grip section of the handle is substantially perpendicular to the blade, and the hand-grip section has a length that is substantially symmetrical about the longitudinal axis of motion.

In accordance with yet another aspect of the invention, a saw handle for use on a saw frame having two ends and a blade attached therebetween is comprised of three members. A first member having two ends is mounted such that the first member is substantially perpendicular to the saw blade and is substantially symmetrical about the saw blade. A second member, also having two ends, has one end attached to the first member, and the other end attached to a third member. The third member has its remaining end attached to the saw frame. The arrangement provides a saw handle with a line of force aligned with the saw blade, wherein the saw is equally balanced and usable in both an upright position and an inverted position.

This open-ended handle positions the hand-grip portion of the handle perpendicular to the axis of the saw blade of the saw to allow the greatest amount of power to be transferred to the saw blade while minimizing strain and fatigue on the user's hand and wrist.

The arrangement is particularly useful in the skilled trade of finish carpentry. For example, it is well known that to make a tight corner fit on crown moldings, a carpenter must use a coping saw to cut the profile on the end of one piece to abut the side of another. In order to do this in a fast and economical fashion, the carpenter can use the present invention in one hand cutting downward while holding the crown molding in the other hand. After cutting half way through the crown molding, the carpenter can easily flip the coping saw into an inverted position because of the open-ended handle and immediately cut upward from the bottom side of the crown molding and finish the cut without having to put down the molding or the saw. It has been found that this arrangement not only provides for quick and efficient cuts, but also greatly reduces the strain on the user's hand and wrist.

The invention also provides a handle for coping and similar saws wherein the handle is perpendicular to the axis of the saw blade and attached at a single point to the saw allowing the handle to be rotated in conjunction with the saw blade. Specifically, a D-shaped handle is provided where a perpendicular cross member is mounted between the two shanks of a D-shaped member. At the center point of the D-shaped member, the D-shaped member has an aperture to allow the handle to slide onto the threaded shaft of a standard blade holder. A standard fastener such as a wing nut may then be threadingly engaged with the shaft to tighten the handle onto the shaft and simultaneously tension the saw blade between the shanks of the saw frame.

Various other features, objects, and advantages of the present invention will be made apparent from the following detailed description and the drawings.

BRIEF DESCRIPTION OF THE DRAWINGS

In the drawings which illustrate those which are presently regarded as the best modes for carrying out the invention:

FIG. 2b shows the handle of FIG. 1 attached to a coping saw in which the handle and the saw blade have been rotated relative to the frame.

FIGS. 3a and 3b show an end view of the blade holder and D-shaped member in a handle employing a ribbed coupling.

FIG. 4 shows a preferred embodiment of a coping saw incorporating the handle of the present invention wherein the handle, the saw blade, and the frame of the saw are aligned in the same plane.

FIG. 5 shows an alternate embodiment of the saw handle of FIG. 4.

DESCRIPTION OF THE PREFERRED EMBODIMENT

Figure 1:
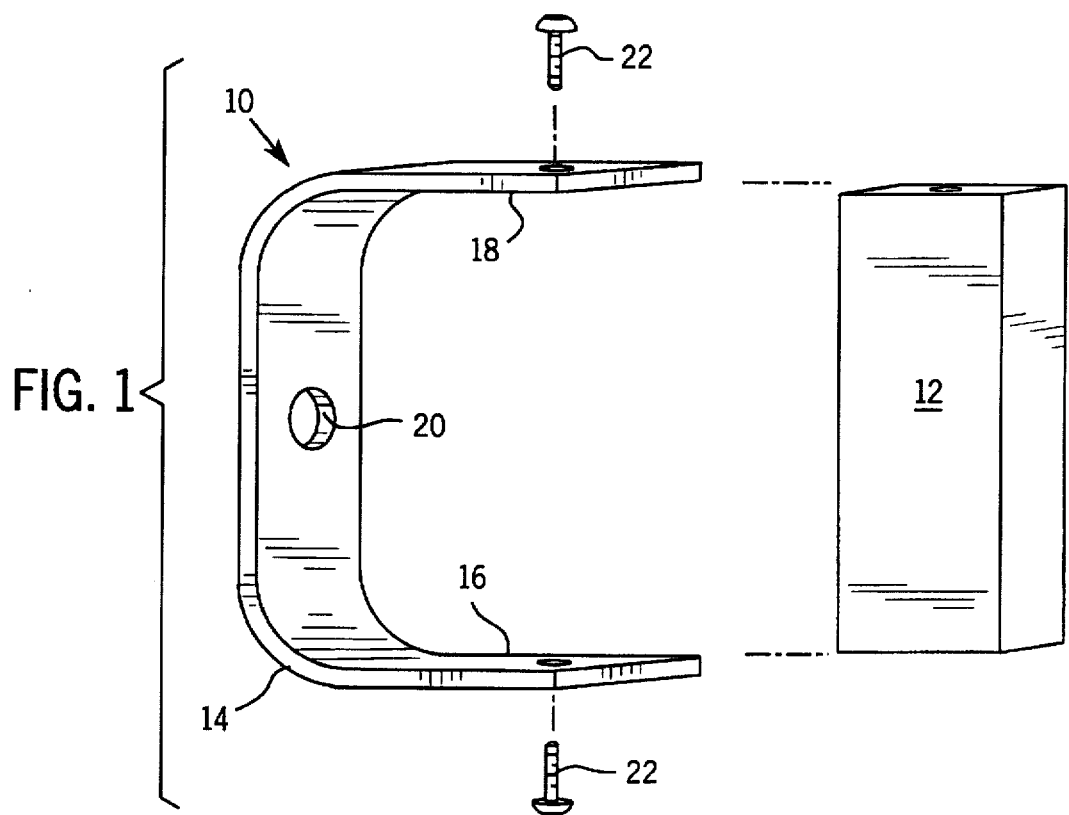
FIG. 1 shows an exploded, elevational side view of the D-shaped handle.

In FIG. 1, a D-shaped handle is shown and generally designated as 10. Handle 10 is comprised of a vertical cross member 12 and a C-shaped member 14. C-shaped member 14 is further defined by a first shank 16 and a second shank 18. An aperture 20 through the face of C-shaped member 14 is provided at its middle point. Cross member 12 is attached by any standard means between first shank 16 and second shank 18. In the preferred embodiment, countersunk screws 22 are used to attach cross member 12 to C-shaped member 14.

Figure 2A:
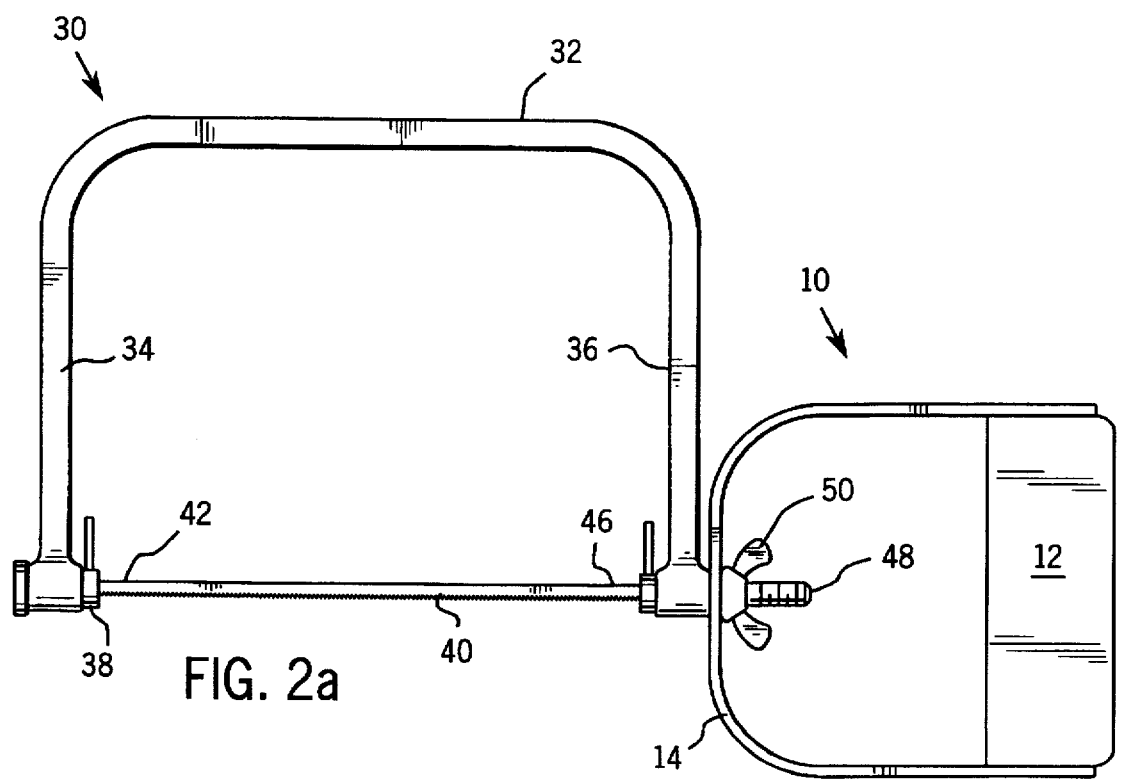
FIG. 2a shows the handle of FIG. 1 attached to a coping saw so that the handle, saw blade and the frame of the saw are aligned in the same plane.

Turning to FIGS. 2a and 2b, D-shaped handle 10 is shown attached to coping saw 30. Coping saw 30 is of standard design and includes a C-shaped frame 32 having a first frame shank 34 and a second frame shank 36. A first blade holder 38 is rotatingly mounted on first frame shank 34 and engages saw blade 40 at the forward end 42 of the blade. A second blade holder 44 similarly engages saw blade 40 at its rear end 46. Second blade holder 44 is rotatingly mounted on second frame shank 36 and is provided with a threaded shaft 48 which extends through aperture 20 (FIG. 1) in second frame shank 36. First and second blade holders 38, 44 shown in FIG. 2 are of standard design and will not be further described herein.

D-shaped handle 10 is joined with coping saw 30 by sliding threaded shaft 48 through aperture 20 (FIG. 1) and threadingly engaging wing nut 50 with shaft 48. Wing nut 50 is tightened on shaft 48 until C-shaped member 14 is adjacent second frame shank 36 and saw blade 40 is properly tensioned between first and second frame shanks 34, 36.

The preferred embodiment described herein allows handle 10 to remain perpendicular to saw blade 40 at all times. This spacial relationship permits the user to apply the greatest amount of force to saw blade 40 while minimizing hand strain and permitting an operator to follow a cut through multiple direction changes. Thus, a continuous, uninterrupted cut can be made without the need to reposition the saw each time a cut changes direction. Also, D-shaped handle 10 requires only gripping and alleviates strain which can occur when pinching is necessary (such as on a straight handle). Additionally, the symmetric position of handle 10 about the linear axis of saw blade 40 is the least demanding on the wrist because the wrist is naturally balanced. Therefore, fatigue of the wrist and hand is minimized by both the perpendicular relationship of saw blade 40 to handle 10 and the symmetric position of handle 10 about the axis of saw blade 40.

Furthermore, as illustrated in FIG. 2b, the symmetric positioning of handle 10 allows handle 10 to be rotated about the axis of saw blade 40 so that cross member 12 remains in the same plane as saw blade 40. In other words, the main axis of cross member 12 is vertically maintained in relation to the direction of cut. This relationship has been found to be most satisfactory in transferring power and maintaining control because the palm of the hand is vertical when the wrist is in its natural position. Therefore, control and power can be maintained no matter how saw blade 40 is positioned relative to C-shaped frame 32.

In a second embodiment, aperture 20 is a slot extending along the surface of C-shaped member 14 towards the ends of first and second shanks 16, 18. When shaped like a slot, aperture 20 permits D-shaped handle 10 to be pivoted about threaded shaft 48 so that cross member 12 can be oriented on a downward angle, sloping away from saw blade 40 in a configuration similar to pistol grip handles. When the operator desires to make a cut in only a single direction, such as toward the operator, D-shaped handle 10 can be pivoted from a symmetric position about threaded shaft 48 to a position which is more optimal for cutting in a single direction.

Those skilled in the art will understand that the shape of shaft 48 and the corresponding shape of aperture 20 may take many different forms. For example, shaft 48 and aperture 20 may have a square shape so that D-shaped handle 10 does not rotate about shaft 48 during use of saw 30. Another example is illustrated in a third embodiment shown in FIGS. 3a and 3b. In this embodiment, aperture 20 in C-shaped member 14 (FIG. 3a) is formed to be coupled with a protrusion 52 located at the base of shaft 48 (FIG. 3b). Again, although the shape of aperture 20 and protrusion 52 may take many different forms, in the embodiment shown, protrusion 52 is ribbed and aperture 20 is correspondingly grooved so that handle 10 (FIGS. 2a and 2b) can be rotated and fixed at defined intervals about blade holder shaft 48. Such a configuration prevents handle 10 from inadvertently rotating about shaft 48 should wing nut 50 become loose, yet allows the angular position of handle 10 to be adjusted to suit the requirements for a particular cope.

Although the attachment of saw blade 40 to C-shaped frame 32 is accomplished with the first and second blade holders 38, 44 shown in FIGS. 2a and 2b, those skilled in the art will understand that the attachment of saw blade 40 to C-shaped frame 32 can be accomplished in many different ways while still permitting handle 10 to be affixed as described herein.

Additionally, those skilled in the art will understand that D-shaped handle 10 of the present invention can be used with any saw that is used to accomplish the types of cuts herein described. For example, D-shaped handle 10 may be combined with a fret saw or a jeweler's saw.

D-shaped handle 10 can be of any suitable material, such as metal, wood or plastic. Further cross member 12 may be provided with grooves (not shown) that conform to the shape of the hand to provide additional comfort.

FIG. 4 shows a saw 100 having a frame 102, a saw blade 104, and a saw handle 106. Preferably, saw 100 is a coping saw, or other similar saw as previously described.

The saw frame 102 has two ends 108 and 110 in which saw blade 104 is attached therebetween. The saw blade 104 has a longitudinal axis of motion when the saw is in use as shown by arrows 112. The open-ended handle 106 is attached to one end 110 of the frame 102 with wing nut 114, such that a hand-grip section 116 of the handle 106 is substantially perpendicular to the saw blade 104. Further, the hand-grip section 116 is substantially symmetrical about the longitudinal axis of motion 112.

The open-ended saw handle 106 can be manufactured in a variety of ways, two of which are shown in FIGS. 4 and 5. The main components of the open-ended saw handle 106 are a first member, or hand-grip section 116, having two ends 118 and 120, a second member 122 having two ends 124 and 126, and a third member 128 also having two ends 130 and 132. One end 132 of the third member 128 is attached to the saw frame 102, and the other end 130 is attached to one end 124 of the second member 122. The other end 126 of the second member 122 is attached to the first member 116 at end 118. As shown in FIG. 5, all three members 116a, 122a, and 128a may be formed of a unitary section of material such as metal, wood, or plastic to form the open-ended handle 106a. Alternatively two of the members 122 and 128 can be formed of a unitary section of material as shown in FIG. 4, and the third member, or hand-grip section 116, can be bolted to the second member 122 with the use of a stud 134 and nut 136.

Referring to FIG. 5, the use and functional advantage of the present invention will now be described. As previously set forth, the saw blade 104 has a longitudinal axis of motion 112 when the saw is in use cutting a material such as wood moldings. Because the saw handle 106, 106a is substantially perpendicular to the saw blade 104, and is also substantially symmetrical about the mounting point at threaded shaft 138 of the saw blade 104, the saw handle 106 has a line of force 140 that is aligned with the saw blade 104 and the longitudinal axis of motion of 112. This results in a saw 100 that is equally balanced and usable in both an upright position and in an inverted position. This is particularly useful in the skilled trade of finished carpentry. For example, it is well known that to produce a tight corner joint in crown moldings, a skilled carpenter must use a coping saw and first saw in a downward direction with the coping saw in an upright position through one-half the cut in the crown molding. The carpenter then must flip the saw to an inverted position and cut in an upward direction from the bottom of the molding to complete the cut. With the use of the present invention, and in particular the open-ended handle 106, the carpenter may easily and quickly flip the coping saw in one hand while holding the molding in the other, and as previously described, the saw is equally balanced and usable in both the upright and inverted positions.

As shown in FIGS. 4 and 5 the open-ended saw handle 106 and 106a is preferably J-shaped. However, the handle may have varying configurations, such as the aforementioned D-shaped handle, as long as the handle is substantially perpendicular to the saw blade and is substantially symmetrical about an end of the saw blade. Further, as shown in FIG. 5, the open-ended handle 106a may also have a flexible hand-grip 142 placed about first number 116a. The hand-grip 142 is strictly for user comfort, and therefore may also be formed with grooves (not shown) to conform to the shape of the user's hand. Further, the star-shaped aperture 20 shown and described with reference to FIGS. 3a and 3b may also be located in the open-ended handle 106 and 106a for mounting and rotating the handle to saw 100, as is previously described.

Although the invention has been described in considerable detail through the figures and above discussion, many variations and modifications can be made by one skilled in the art without departing from the spirit and scope of the invention as described in the following claims.

I claim:

1. A saw comprising:

a saw blade having a longitudinal axis of motion when the saw is in use;

a frame having two ends and having the saw blade attached therebetween; and an open-ended J-shaped handle having one end attached to one end of the frame such that a hand-grip section on the other end of the J-shaped handle is substantially perpendicular to the blade and wherein the hand-grip section has a length having a center that is substantially symmetrical about the longitudinal axis of motion of the saw blade.

2. The saw of claim 1 wherein the J-shaped handle has a line of force aligned with the saw blade and wherein the saw is equally balanced and useable in both an upright position and an inverted position.

3. The saw of claim 1 further comprising a hand-grip placed about the hand-grip section.

4. The saw of claim 1 wherein the hand-grip section is formed from a unitary section of material.

5. The saw of claim 1 wherein a mounting aperture is located in the open-ended J-shaped handle.

6. The saw of claim 5 wherein the aperture is slot-shaped.

7. A J-shaped saw handle for use on a saw having a saw frame with two ends and a blade attached therebetween, the saw handle comprising:

a first rigid member having two ends and capable of being substantially perpendicular to the blade and substantially symmetrical about an end of the blade when the handle is attached to the saw;

a second rigid member having two ends, one end of the second rigid member attached to one end of the first rigid member; and a third rigid member attached to the other end of the second rigid member and having an aperture therein that is connectable to the saw frame, the aperture being substantially symmetrical about the first rigid member.

8. The saw handle of claim 7 wherein the saw handle has a line of force aligned with the blade and such that the saw is equally balanced and useable in both an upright position and an inverted position.

9. The saw handle of claim 7 further comprising a hand-grip placed about the first rigid member.

10. The saw handle of claim 7 wherein the first, second, and third rigid members are formed from a unitary section of material.

11. The saw handle of claim 7 wherein the aperture is slot-shaped.

12. A saw handle for use on a saw having a saw frame with two ends and a blade attached therebetween, the saw handle comprising a J-shaped member having a long end and a short end, the short end capable of attachment to the saw frame at a point of attachment, and the long end being substantially perpendicular to the blade and having a length substantially symmetrical about the point of attachment of the short end such that the saw handle has a line of force aligned with the blade.

* * * * *